(12) United States Patent
Mussino et al.

(10) Patent No.: US 6,313,701 B1
(45) Date of Patent: Nov. 6, 2001

(54) EXTERNAL OPTICAL MODULATION SYSTEM COMPRISING A PREDISTORTER

(75) Inventors: Franco Mussino, Turin; Massimo Notargiacomo, Candelo; Gianluca Gobetti, Castelvetro Piacentino; Giuseppe Ravasio, Capriate San Gervasio; Claudio Zammarchi, Milan, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/440,681

(22) Filed: Nov. 12, 1999

Related U.S. Application Data (63) Continuation of application No. PCT/EP98/02696, filed on May 8, 1998.
(60) Provisional application No. 60/050,061, filed on Jun. 13, 1997.

(30) Foreign Application Priority Data

May 8, 1998 (IT) .............................. MI97A1097

(51) Int. Cl.$^7$ ..................................... H03F 1/26
(52) U.S. Cl. .......................................... 330/149; 359/180
(58) Field of Search ........................... 330/149; 359/180, 359/181

(56) References Cited

U.S. PATENT DOCUMENTS

| 5,172,068 | 12/1992 | Childs . | |
|---|---|---|---|
| 5,523,716 | 6/1996 | Grebliunas et al. . | |
| 5,550,667 | * 8/1996 | Krimmel et al. | 359/180 |
| 5,600,472 | * 2/1997 | Uesaka | 359/161 |
| 5,812,297 | * 9/1998 | Mussino et al. | 359/181 |
| 5,963,352 | * 10/1999 | Atlas et al. | 359/161 |
| 6,107,877 | * 8/2000 | Miguelez et al. | 330/66 |
| 6,140,858 | * 10/2000 | Dumont | 327/317 |

FOREIGN PATENT DOCUMENTS

| 0 475 376 A2 | 3/1992 | (EP) . | |
|---|---|---|---|
| 0 475 376 A3 | 3/1992 | (EP) . | |
| 0 498 456 | 8/1992 | (EP) . | |
| 0 620 661 | 10/1994 | (EP) . | |
| 1-419-519 | * 12/1975 | (GB) | 330/149 |

OTHER PUBLICATIONS

A.H. Gnauck et al., "Comparison of Direct and External Modulation for CATV Lightwave Transmission at 1·5μm Wavelength", Electronic Letters, vol. 28, No. 20, pp. 1875–1876, (1992).
R.D. Stewart, et. al., "Predistortion Linearisation of Amplifiers for UHF Mobile Radio", Conference Proceedings, 18$^{th}$ European Microwave Conference, pp. 1017–1022, (1988).
M. Nazarathy et al., "Progress in Externally Modulated AM CATV Transmission Systems", Journal of Lightwave Technology, vol. 11, No. 1, pp. 82–105, (1993).

* cited by examiner

Primary Examiner—Robert Pascal
Assistant Examiner—Henry Choe
(74) Attorney, Agent, or Firm—Finnegan, Henderson, Farabow, Garrett & Dunner, L.L.P.

(57) ABSTRACT

The present invention relates to a method and to a signal predistorter circuit for elimiating the nonlinearities in the input/output characteristics of nonlinear stages, in particular for eliminating the third-order nonlinearities. More particularly, it relates to a method and to a predistorter circuit for external optical modulators of television signals. The method for predistortion of a signal of variable amplitude comprises the phases of: delivering the said signal to at least one first distorter circuit; biasing the said at least one first distorter circuit; distorting the said signal in the said at least one first distorter circuit; characterized in that the said phase of biasing the said at least one first distorter circuit comprises the phase of maintaining a substantially constant preset voltage value on varying the amplitude of the said signal at the said at least one first distorter circuit.

27 Claims, 8 Drawing Sheets

EXTERNAL OPTICAL MODULATION SYSTEM COMPRISING A PREDISTORTER

This application is a continuation application of PCT International application Ser. No. PCT/EP98/02696, filed May 8, 1998, the content of which is incorporated by reference herein and claims the benefit of U.S. Provisional Application No. 60/050,061 filed Jun. 13, 1997.

BACKGROUND OF THE INVENTION

1. Field of The Invention

The present invention relates to a method and to a signal predistorter circuit for eliminating the nonlinearities in the input/output characteristics of nonlinear stages, in particular for eliminating the third-order nonlinearities. More particularly, it relates to a method and to a predistorter circuit for external optical modulators of television signals.

2. Description of the Related Art

The distributing of television signals via CATV (CAble TeleVision) apparatus can be performed with optical fibres. Modulation of the optical signals can be achieved directly, by acting upon the optical source, usually a laser, or indirectly, via an optical modulator.

An optical modulator which makes it possible to perform the amplitude modulation of an optical signal, with a radiofrequency (RF) modulating signal (also known as the external signal) having very high frequencies (as for example other carriers of television channels which conventionally range from 40 to 860 MHz), consists for example of a device based on an interferometer of the Mach-Zehnder type constructed in lithium niobate ($LiNbO_3$).

A characteristic which is required of an external modulator is linearity of modulation, very important for use in CATV apparatus with analogue type transmission, in particular when the modulating signal is not a single television channel, but consists of many television channels, for example from 40 up to 80 channels.

The electro-optical characteristic (optical output power versus radiofrequency input voltage) of modulators of this type (Mach-Zehnder interferometer) is typically nonlinear. To limit the distortion of the signals it is expedient to operate the modulator near as linear a stretch as possible of the characteristic.

For this purpose, to an electro-optical modulator of the Mach-Zehnder interferometer type there is applied a radiofrequency (RF) modulating signal to an electrode RF and, to the same electrode or to a second electrode, a d.c. supply voltage which determines the working point of the modulator.

A modulator of this type is for example marketed by the Applicant under the reference PIR PIM1510.

The modulating signal, applied to the RF input, consists, for example, of the set of modulated carriers of the television channels to be distributed to the user.

In the case of a Mach-Zehnder modulator the profile of the characteristic can be approximated by a sinusoid, and it is advantageous that the modulator operate near the point of inflection of the sinusoid, to correspond with an applied working point VQ voltage.

The modulation characteristic of the Mach-Zehnder modulator, referred to the working point, can be expressed through the relation:

$$P_u = K_z \sin\beta$$

where:

$P_u$ is the optical output power $K_z$ is a coefficient which depends on the characteristic of the Mach-Zehnder modulator.

$\beta = \pi V/V_x$ is the modulation index of the modulating signals, expressed in radiands V is the variation in the applied voltage, with respect to the working voltage VQ $V_x$ is a constant.

This characteristic with sinusoidal profile is distinguished by two values:

the value of the voltage, the said $V\pi$, which represents the voltage variation to be applied to the RF (radiofrequency) electrode so as to carry the optical power from the maximum value to the minimum value;

the value of the voltage VQ which should be applied to the supply electrode, so as to cause the working point to correspond to that of inflection of the characteristic with sinusoidal profile, i.e. with odd symmetry. In such a case the distortions of even order (comprising the second harmonic of the applied signals) vanish and the distortions of odd order take on a well defined value.

For example, in the case of a Mach-Zehnder modulator of the PIR PIM1510 type, produced by the Applicant, the aforesaid voltages can take the following values:

$$V\pi = 4.3V \text{ and } VQ = 0.7V.$$

The value of the voltage VQ of the working point is not constant, but varies over time (for example through the build-up of static charge in the $LiNbO_3$) and also with temperature.

Hence the value of the working voltage has to be continually adapted, using as information, for example, the presence and magnitude of the distortions of even order, or of the second-order intermodulation products, referred to overall as CSO (Composite Second Order).

In the case also of the operation of the modulator at the aforesaid working point, which minimizes the distortions of even order, the nonlinearity in the input/output characteristic causes residual distortions of odd order (mainly of third order) which get translated into intermodulation products or CTBs (Composite Triple Beats) and cross modulation (XMOD), which impair the quality of the signals reaching the user. Thus, the quality of television channels, with amplitude modulation of the carrier, is greatly influenced by the presence of the aforesaid intermodulation products, the overall level of which has to be maintained sufficiently low, for example over 65 dB below the level of the picture carrier of each channel, as to obtain good quality of the signals distributed to the users.

To limit these distortions to some extent it is expedient to chose a not too high depth of modulation for the modulating signals (where depth of modulation is to be understood as the maximum value, expressed as a percentage, of the modulation index $\beta$), for example around 3.5% or 4% per channel so as to operate as close as possible to the linear portion of the characteristic.

For the purpose of limiting the distortion introduced by the nonlinearity in the characteristic of the modulator, the maximum percentage usage of the modulator is usually about 40%. Thus, the maximum number of channels which can be applied, bearing in mind the aforesaid requirements relating to noise characteristics, is derived by considering that the various carriers, being uncorrelated, sum together statistically in phase quadrature; therefore, the sum of the channels is to be considered in terms of power. Hence, the maximum number of channels which can be applied to the modulator so as not to exceed the aforesaid percentage is around 100.

To reduce the residual distortions, and in particular the third-order distortions, the technique has been suggested of predistorting the modulating signals through the use of nonlinear elements, in such a way that the predistortion is compensated by the subsequent distortion on the part of the modulator. For this purpose a distorter circuit, with an input/output characteristic in respect of the radio frequency signals which is the inverse function of the input/output characteristic of the modulator, can be placed ahead of the modulator.

SUMMARY OF THE INVENTION

For the purposes of the present invention, a distorter circuit should be understood as an electrical circuit, in particular one comprising nonlinear circuits, which to correspond with an electrical signal delivered to its input, generates as output a signal which is a preset, nonlinear, function of the input signal.

This technique and circuit examples used for this purpose are for example explained in the article by M. Nazarathy et al. "Progress in Externally Modulated AM CATV Transmission Systems", published in the Journal of Lightwave Technology, vol. 11, no. 1, 01/93, pages 82–104. In particular, this shows a circuit which uses diodes biased by a current source as nonlinear elements.

In Patent Application EP 0 620 661 and in the patent U.S. Pat. No. 5,172,068 distorter circuits are described which comprise diodes connected in parallel in such a way as to have opposite polarity with respect to the input signal. The diodes operate as nonlinear elements with a predetermined bias value. They are biased by voltage generators via a resistor or by current generators.

According to the present invention, the Applicant has found that the circuits of the above-mentioned references exhibit drawbacks.

In particular it has been noted that the amount of the distortions produced by them are in some cases insufficient to compensate for the distortions generated by the modulator.

Moreover the Applicant has observed that the performance of such circuits varies on varying the amplitude of the input signal.

In particular the Applicant has noted that on increasing the amplitude of the applied signal the distortions introduced by the distorter circuits of this type decrease with respect to the theoretical value and are unable to compensate for the distortions introduced by the modulator.

The Applicant believes this to be due to the fact that the working point of diodes varies on varying the amplitude of the applied signal.

In particular it is believed that the distortions of even order generate d.c. components which modify the working point of diodes.

According to the present invention it is found that by supplying the diodes in such a way that the voltage applied to them is constant, the working point does not vary, and it is therefore possible to produce the required amount of distortions to correspond to a wide range of variation in the amplitude of the input signal.

In its first aspect, the present invention relates to a method for the predistortion of a signal of variable amplitude comprising the phases of:

delivering the said signal to at least one first distorter circuit;

biasing the said at least one first distorter circuit;

distorting the said signal in the said at least one first distorter circuit;

characterized in that the said phase of biasing the said at least one first distorter circuit comprises the phase of maintaining a substantially constant preset voltage value on varying the amplitude of the said signal at the said at least one first distorter circuit.

Preferably it further comprises the phases of:

delivering the said signal to at least one second distorter circuit;

biasing the said at least one second distorter circuit;

distorting the said signal in the said at least one second distorter circuit;

combining the said signals distorted by the said at least one first and one second distorter circuit.

Preferably the method comprises the phases of delivering the said signal to a linear attenuator and combining the said attenuated signal with the said distorted signal.

In a preferred form the phase of maintaining a substantially constant preset voltage value on varying the amplitude of the said signal comprises the following phases:

measuring the bias voltage of the said at least one first distorter circuit;

comparing the said measured bias voltage with a preset reference voltage;

producing a control signal representative of the said comparison;

controlling the said bias voltage in response to the said control signal in such a way that the said bias voltage has a substantially constant preset voltage value on varying the amplitude of the said signal.

Preferably the phase of producing a control signal is followed by a phase of integrating the said control signal.

In a particular embodiment the phase of maintaining a substantially constant preset voltage value on varying the amplitude of the said signal comprises the following phases:

measuring, in a portion of the circuit, an electrical quantity representative of the said bias voltage of the said at least one first distorter circuit;

calculating the value of the said bias voltage as a function of the said electrical quantity representative of the said bias voltage;

comparing the said calculated bias voltage with a preset reference voltage;

producing a control signal representative of the said comparison;

controlling the said bias voltage in response to the said control signal in such a way that the said bias voltage has a substantially constant preset voltage value on varying the amplitude of the said signal.

Preferably the said electrical quantity is a voltage.

In its second aspect the present invention relates to a circuit for the predistortion of an electrical signal of variable amplitude comprising:

an input terminal, able to receive an electrical input signal of variable amplitude;

an output terminal, able to send out an electrical signal to correspond with the said input signal;

a nonlinear element, interposed between the said input terminal and the said output terminal, having a preset relation between an input signal and a corresponding output signal;

a bias circuit electrically connected to the said nonlinear element; characterized in that the said bias circuit comprises means of applying a preset voltage to the said nonlinear element, the said preset voltage being substantially constant on varying the amplitude of the said input signal.

In particular it comprises a first and a second nonlinear element which are connected in parallel with respect to the said input signal.

Preferably it comprises a linear attenuator connected in parallel to the said nonlinear element with respect to the said input signal.

Preferably the said nonlinear element comprises at least one diode.

Preferably the said first and second nonlinear element comprise at least one diode.

Preferably the said at least one diode of the said first nonlinear element is placed with opposite polarity with respect to the said at least one diode of the said second nonlinear element.

In a preferred form the said said bias circuit comprises at least one diode, connected in parallel with the said nonlinear element, having a bias current such as not to be able to be modified by the said input signal.

In particular the said diode is a Schottky diode.

Preferably the said said bias circuit is connected to the said at least one nonlinear element via at least one resistor.

In a preferred embodiment the said said bias circuit comprises:

a circuit for measuring the bias voltage of the said nonlinear element;

a generator of a preset reference voltage;

a circuit for comparing between the said measured bias voltage and the said preset reference voltage able to deliver a signal representing the said comparison;

a circuit for controlling the said bias means in response to the said signal representing the said comparison.

In a preferred embodiment the said bias circuit comprises:

means of calculating the bias voltage of the said nonlinear element by measuring a voltage representing the said bias voltage of the said nonlinear element;

a generator of a preset reference voltage;

a circuit for comparing between the said measured voltage and the said preset reference voltage able to deliver a signal representing the said comparison;

a circuit for controlling the said bias means in response to the said signal representing the said comparison.

Preferably the said calculating means comprise an analogue calculating circuit.

Preferably, it further comprises a circuit integrating the said signal representing the said comparison.

In particular the said linear attenuator comprises a resistor.

In particular the said nonlinear element comprises a capacitor which exhibits an impedance with respect to the a.c. components of the signal of low value relative to the impedance seen by the said capacitor.

Preferably the said bias circuit comprises an adjustable voltage generator.

Preferably the said bias circuit comprises an adjustable current generator.

In its third aspect the present invention relates to an externally modulated optical transmitter comprising:

a predistorter circuit to which is applied a modulating signal comprising at least one biased nonlinear element;

an electrooptical modulator, able to output a modulated optical signal, having an electrical input to which the predistorted modulating signal is applied and having an optical input;

a radiation source connected to the optical input of the said modulator;

characterized in that it comprises means of biasing the said at least one nonlinear element of substantially constant preset voltage on varying the amplitude of the said signal.

Preferably the said electrooptical modulator comprises an interferometric modulator of the Mach-Zehnder type.

Preferably it further comprises an amplifier having an input for the predistorted modulating signal and an output connected to the said electrooptical modulator.

BRIEF DESCRIPTION OF THE DRAWINGS

More details may be gleaned from the following description, with reference to the appended drawings in which is shown.

DETAILED DESCRIPTION OF THE INVENTION

Figure 1:
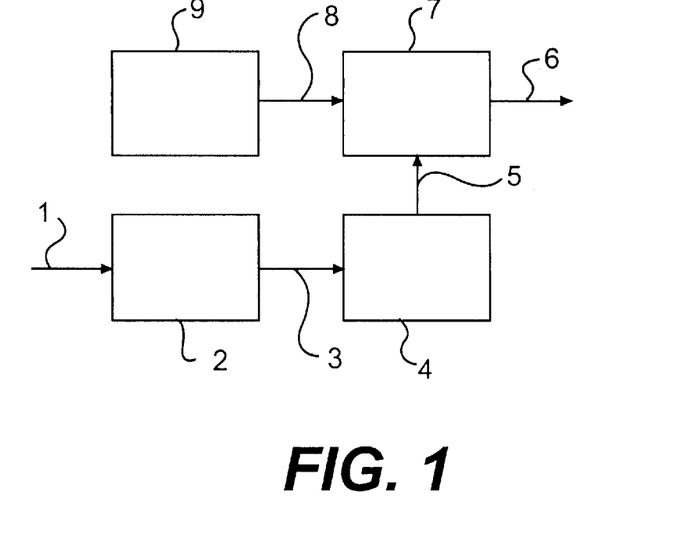
In FIG. 1 a diagram of an externally modulated optical transmitter.

An analogue externally modulated optical transmitter will now be illustrated with reference to the block diagram of FIG. 1.

The label 1 indicates an input for electrical signals for radiofrequency modulation, which lie in a specified frequency band. The input 1 is linked to a distorter circuit 2. This distorter 2 is endowed with an input/output characteristic (output voltage versus input voltage) chosen as will be indicated below. The distorter 2 is preferably followed by an amplifier 4, operating in the frequency band of the radiofrequency electrical modulation signals, which in the case for example of CATV systems range from 40 to 860 MHz.

The output 5 of the amplifier 4 is connected to an electrical input of an electro-optical modulator 7.

Connected to an optical input of the modulator 7, via an optical fibre 8, is a radiation source 9, able to generate a continuous optical signal. This source can consist of a laser, in particular of the semiconductor type.

The modulator 7 sends the modulated optical signal to the output 6.

The input/output characteristic of the distorter 2 is expediently chosen on the basis of the input/output characteristic of the electro-optical modulator, in such a way as to compensate for its nonlinearity, or in such a way as to obtain as linear a relation as possible between the power of the optical signal output by the modulator and the voltage of the modulation signal present at the input 1; in particular this is expediently chosen in such a way as to minimize the third-order distortions of the modulator 7. The distorter 2 chiefly generates third-order distortions with amplitude equal but of opposite sign to those generated by the non-linear characteristics of the modulator 7.

The amplifier 4 is used to adapt the amplitude of the signals, processed in the predistortion circuit, to the amplitude of the signals required by the modulator to obtain sufficient depth of modulation.

Diodes or transistors can be used as nonlinear elements to obtain an input/output characteristic of the distorter 2 of this type.

In the example described and preferably in cases in which operation occurs in the band of the order of video frequencies (40–860 MHz) the distorter circuit 2 uses diodes as nonlinear elements.

Figure 2:
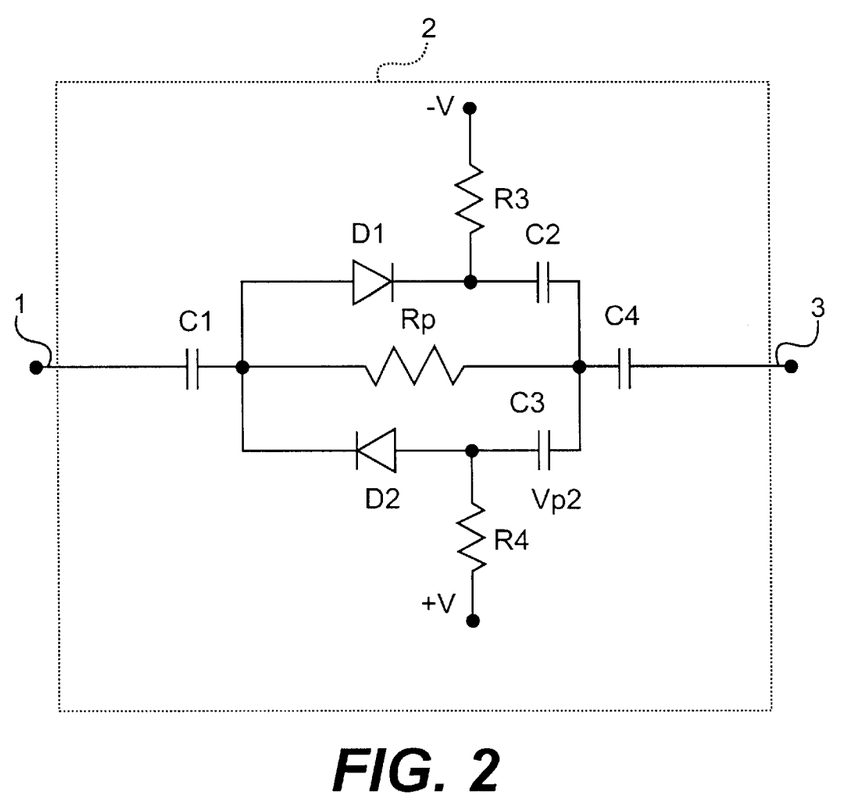
In FIG. 2 a simplified electrical diagram of a distorter circuit.

Shown in FIG. 2 is a simplified electrical diagram of a distorter circuit 2.

The input signal to be distorted is applied to the input terminal 1. Via a capacitor C1 the signal is transferred to two parallel branches each composed of a diode D1 and D2 and of a capacitor C2 and C3. These diodes D1 and D2 are arranged with mutually opposite polarities. The diode D1 has its anode connected to the capacitor C1 and has its cathode connected to the terminal of a resistor R3 and to the capacitor C2. The other terminal of the resistor R3 is connected to the negative supply voltage −V.

The diode D2 has its cathode connected to the capacitor C1 and has its anode connected to the terminal of the resistor R4 and to the capacitor C3. The other terminal of the resistor R4 is connected to the positive supply voltage +V.

A resistor Rp is preferably connected in parallel with the previously described two branches. This resistor allows a greater degree of freedom in the design of the circuit. In particular it enables the level of the input signal (attenuated by the diodes D1 and D2) to be raised in such a way as to allow the use of the subsequent amplifier stage 4 with a gain not exceeding 15–18 dB.

The resistor Rp, the capacitor C2 and the capacitor C3 are connected via a capacitor C4 to the output terminal 3, where the distorted signal will be present.

The capacitors C1 to C4 are used to constrain the bias current of the diodes within the distorter circuit 2.

In FIG. 2 each branch has only one diode but there may be more than one depending on the performance required.

The supply voltages +V and −V must be chosen in such a way as to bias the diodes D1 and D2 at a working point where the current/voltage characteristics exhibit nonlinearities, in particular by varying the working point of the diodes it is possible to vary the magnitude of the distortions produced.

The circuit represented in FIG. 2 is able to generate 3rd order distortions chiefly. The magnitude of these distortions is controlled through the value of the supply voltages +V and −V. On the other hand, the 2nd order distortions vanish on account of the symmetry of this circuit. It is also possible to use a single diode, for example by eliminating the diode D2, the capacitor C3, the resistor R4 and the supply voltage +V. In this way, a non-symmetric circuit of this type will also produce 2nd order distortions also. In what follows reference will be made to symmetric circuits of the type depicted in FIG. 2. It is however within the scope of a person skilled in the art to utilize the teachings described in what follows also in the case of non-symmetric circuits which use a single diode.

The Applicant has constructed an externally modulated optical transmitter, described below, with reference to the block diagram of FIG. 1.

The electro-optical modulator 7 employed is a model PIR PIM1510 Mach-Zehnder type modulator produced by the Applicant.

The radiation source 9 consists of a laser, in particular of the DFB type.

Figure 3:
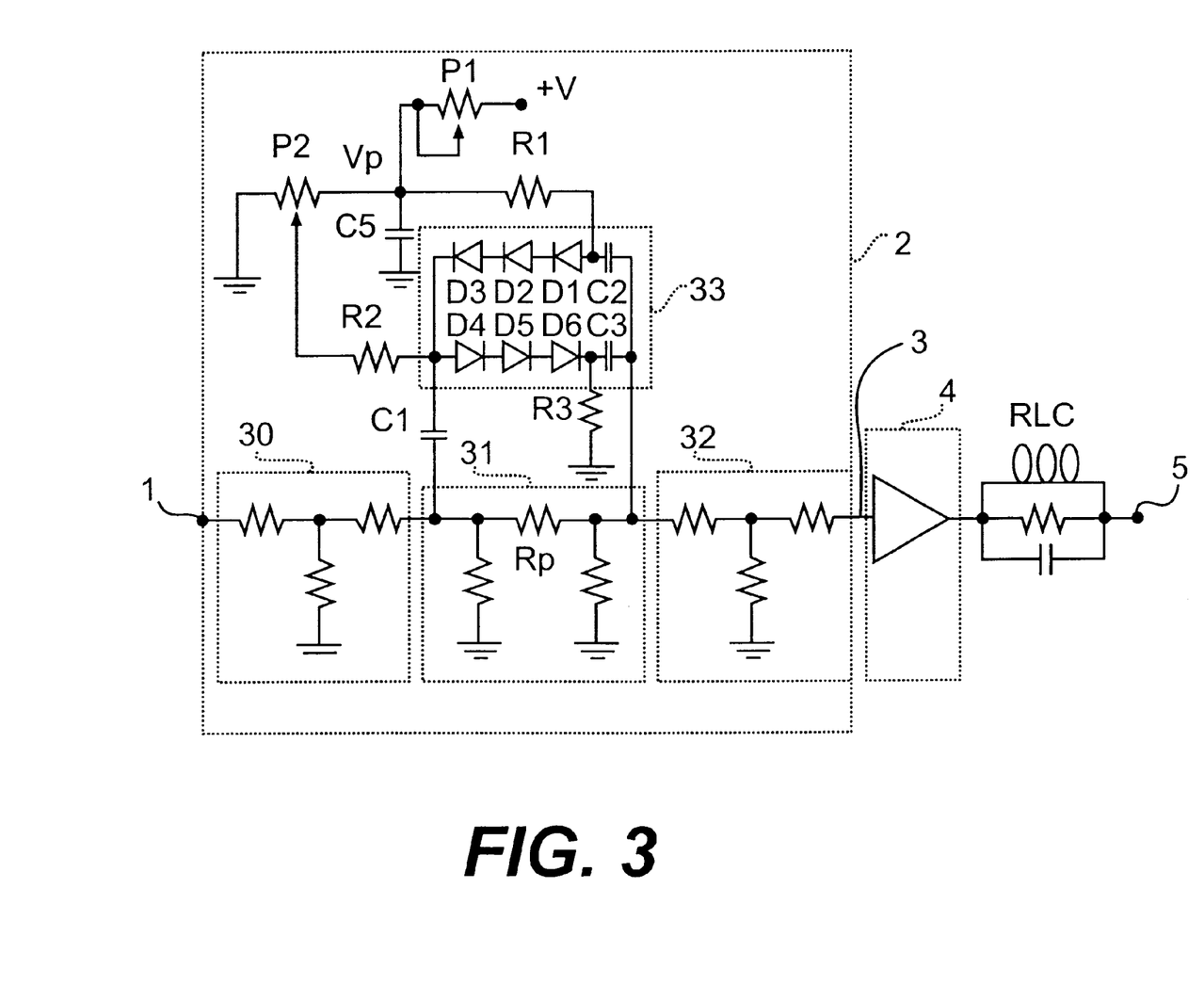
In FIG. 3 a complete electrical diagram of a distorter circuit.

The group consisting of the distorter 2 followed by the amplifier 4 is represented in FIG. 3. With respect to the simplified electrical diagram of a distorter circuit of FIG. 2, the complete electrical diagram of a distorter circuit of FIG. 3 shows in addition the circuits, described below, for interfacing and connection with the other elements of the optical transmitter.

The input signal applied to the input 1 is sent to a T resistive attenuator 30 having an attenuation of around 3.5 dB, and then to a π resistive attenuator 31 with an attenuation of around 9 dB. It is then sent to a T resistive attenuator 32 having an attenuation of around 1.5 dB and then to the amplifier 4.

The resistive attenuators 30, 31 and 32 make it possible to match the impedances and the levels of the signal suitably among the various elements of the circuit.

The nonlinear circuit 33 is composed of 6 diodes D1 to D6 arranged in two branches connected in parallel. Each branch is composed of three diodes D1, D2, D3; D4, D5, D6; the diodes D1, D2, D3 in a first branch are arranged with their polarity opposite to the diodes D4, D5, D6 in the other branch. The diodes used are preferably Schottky diodes of the MA4E976L type marketed by MACON, but other types of diodes may be used, for example diodes having a low threshold voltage.

In each branch there is a capacitor C2, and respectively C3, in series with the diodes so as to decouple the d.c. component; a first terminal of the capacitor C2 is connected to the anode of the diode D1, a first terminal of the capacitor C3 is connected to the cathode of the diode D6, the second terminals of the capacitors C2 and C3 are joined together.

The nonlinear circuit 33 is connected in parallel with the resistive attenuator 31. A capacitor C1 connects the point of junction between the anode of D4 and the cathode of D3 of the nonlinear circuit 33, which corresponds to the input terminal of the nonlinear circuit 33, to one end of the it resistive attenuator 31. The second terminals of C2 and C3 are connected to the other end of the π resistive attenuator 31, which corresponds to the output terminal of the nonlinear circuit 33. The resistor Rp of FIG. 2, which was placed directly in parallel with the branches containing the diodes D1 to D6, consists here of the resistor placed in series for the input signal of the π resistive attenuator 31. The value of the resistor Rp is for example chosen in such a way that the input signal is attenuated less relative to a circuit lacking this resistor; the subsequent amplification is therefore smaller as also is the noise contribution due to the amplifier.

A first variable potentiometer P1, having two lateral terminals and one variable central terminal, has a lateral terminal connected to a supply voltage +V, the other lateral terminal and the central terminal are connected to a lateral terminal of a second potentiometer P2. The other lateral terminal of the potentiometer P2 is connected to the earth terminal. The potentiometers P1 and P2 have the function of divider of the supply voltage +V, and produce a voltage Vp at the point of connection between them. Connected between this point and the earth terminal is a capacitor C5 for stabilizing the voltage Vp. The voltage Vp is applied to the anode of the diode D1 via a resistor R1. The cathode of the diode D6 is connected to the earth terminal via a resistor R3. The central terminal of the potentiometer P2 is connected between the two branches of diodes D1–D6, in particular between the cathode of the diode D3 and the anode of the diode D4 via a resistor R2.

The bias current in the diodes (around 30 $\mu$A) is obtained through the two high-value resistors R1 and R3 (around 33 k$\Omega$). The capacitors C1, C2 and C3 have a value of around 100 nF.

The bias current of the diodes, which determines the amount of the distortions produced by the distorter circuit 2, is adjusted, in the calibration phase, by varying the voltage (Vp) through the potentiometer P1.

The balance of the currents in the two branches of diodes, to minimize the second-order distortions, is adjusted through the potentiometer P2.

Optimization of the circuit is achieved by suitably choosing the value either of the resistance of the $\pi$ resistive attenuator 31, or the bias current of the diodes in such a way as to obtain the desired distortion.

The amplifier 4 expediently exhibits an appropriate amplification value, and also suitable dynamic, linearity and noise characteristics which are taken into account in the design phase according to known methods, which will not be examined here.

To equalize the frequency response of the amplifier 4, so as to improve both the frequency response and the profile of the distortions on varying the frequency, an RLC network is placed at its output.

The amplification is around 17 dB and is obtained using the amplifier CA 922 marketed by Motorola.

The signal level to be applied to the input to obtain a depth of modulation equal to 4% is –17 dBm and –18 dBm for 3.5%.

Measurements of CTB and XMOD have been made, with 80 television channels and with a modulation index of 3.5%, carried out on the optical modulator linearized using the aforesaid distorter circuit; the values of which are set out in the following table.

| Frequency (MHz) | CTB (dB) | XMOD (dB) |
|---|---|---|
| 55.25 | –65 | –55 |
| 355.25 | –64 | –54 |
| 547.25 | –65 | –55 |

The results of the measurement refer to the case in which the CTB value is minimized by varying the bias current of the diodes D1 to D6. This value is markedly improved with respect to that of XMOD.

It has been found that an improvement in the value of XMOD can be obtained by slightly reducing (around 10%) the value of the bias current in the diodes. In this case, however, the value of CTB worsens.

The Applicant has noted that both the value of CTB and that of XMOD depend mainly on the magnitude of the 3rd order distortions. By varying the bias current of the diodes D1–D6 of the distorter 2, the amount of the predistortions produced is determined, in particular those of 3rd order, which are larger in magnitude. The Applicant would therefore have expected that the measurements of CTB and XMOD would exhibit a minimum value for the same magnitude of predistortion produced and hence for the same bias current of the diodes.

Figure 4:
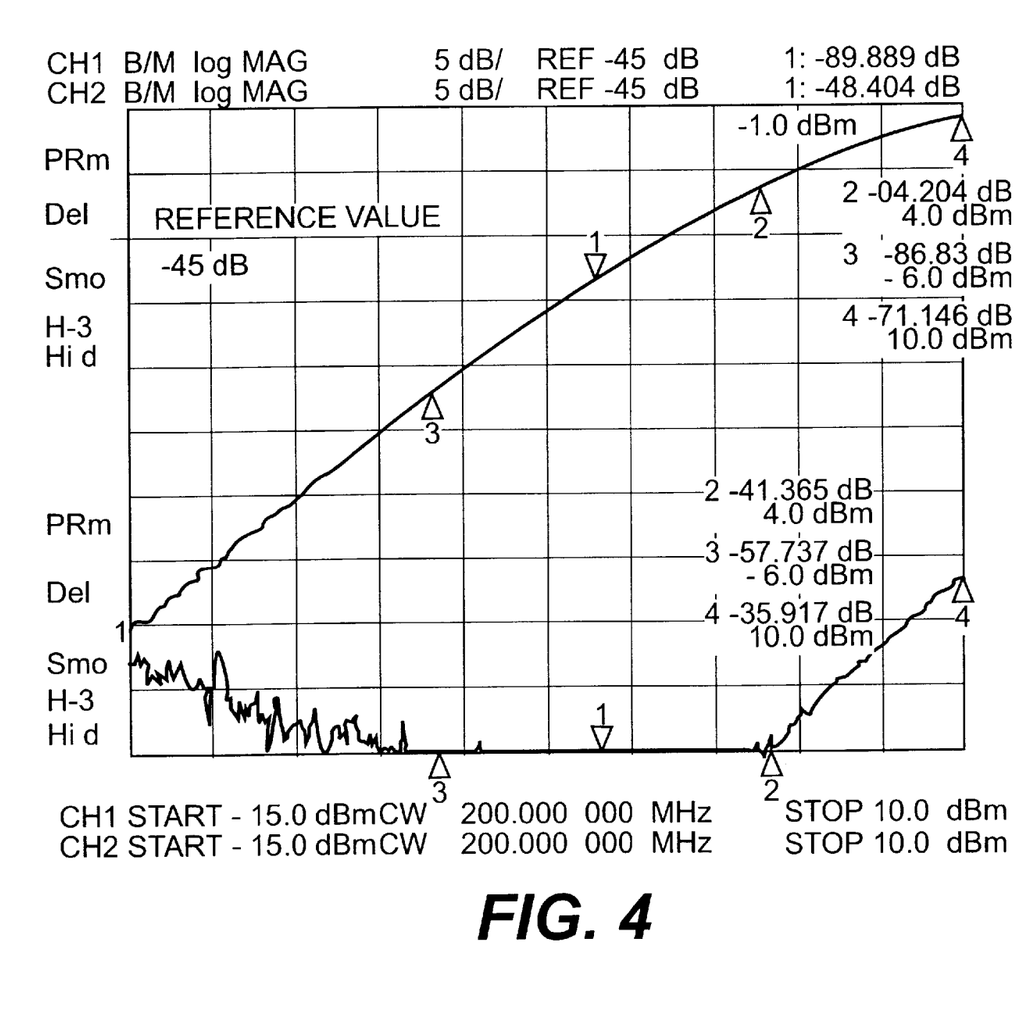
In FIG. 4 the profile of the measurement of the third-harmonic distortion of the distorter circuit of FIG. 3.

Measurement of the third-harmonic distortion of the distortion circuit has therefore been performed by measuring the ratio D3/C (the ratio between the 3rd harmonic distortion and the value of the carrier) on varying the level of the input signal from –15 dBm to +10 dBm, at the frequency of 200 MHz, represented in FIG. 4. With reference to FIG. 4, the input/output characteristic of a nonlinear device is analyzed, which can be approximated analytically as a power series expansion of for example the type $$Vu = K1\ Vi + K2\ Vi^2 + K3\ Vi^3 + K4\ Vi^4 \qquad (1)$$

where Vu is the output signal, Vi is the input signal and K1, K2, K3, K4 are constants.

If the input signal is for example a sinusoid:

$$Vi = Vi\ \cos\omega \qquad (2)$$

then the output is:

$$Vu = K1\ V\cos\omega t + (\tfrac{1}{2})K2\ V^2 + (\tfrac{1}{2})K2\ V^2\cos 2\omega t + (\tfrac{1}{4})K3\ V3\cos 3\omega t + (\tfrac{3}{4})K3\ V^3\cos\omega t + \qquad (3)$$

truncating the expansion at the 3rd order terms.

It is noted from the last equation that the 3rd harmonic distortions grow in proportion to the cube of the amplitude of the input signal and hence grow by 3 dB for each dB of rise of the input signal, hence the ratio D3/C grows by 2 dB for each dB of rise of the input signal.

Measurements made of the D3/C distortions introduced by the distorter 2, which are represented in FIG. 4, show that these are not equal to 2 dB for each dB of increase in the input signal, as would have been expected, but show a smaller rise.

In particular the profile of the distortions shows that an applied signal of level greater than 0 dBm involves a smaller rise than the value of 2 dB of rise for each dB of rise of the level of the applied signal.

The Applicant has noted a relation between the level of the signal applied and the amount of the distortions produced.

The Applicant believes this behavior to be attributable to the presence of even-order distortions of any order but chiefly of 2nd order (because of the greater amplitude relative to those of higher order), which also generate d.c. components, such as for example the term ($\tfrac{1}{2}$) K2 $V^2$ in equation (3).

The Applicant has noted that, referring to the diagram of FIG. 3 and on the basis of the symmetric structure of the nonlinear circuit 33, at the point of connection between the capacitors C2 and C3, i.e. at the output of the diodes D1–D6, the signal components of even order originating from the two parallel branches compensate one another and vanish, whereas the d.c. components are summed algebraically with the bias currents of the diodes D1–D6.

The Applicant has therefore noted that in the circuit of FIG. 3 the presence of d.c. components, due to the distortions of even order, determines the variation in the working point of these diodes, in particular entails a reduction in the voltage of the working point of the diodes. This variation in the working point entails a reduction in the magnitude of the odd-order distortions generated and in particular the 3rd harmonic distortions.

It follows from this that on increasing the level of the signal applied to the distortion circuit, the magnitude of the variation in the working point increases, and hence the 3rd harmonic distortion increases to a smaller extent than predicted theoretically, as evidenced by the curve of FIG. 4.

The Applicant has therefore noted that the presence of this effect precludes the possibility of maintaining the compensation of the 3rd order distortions unchanged on varying the level of the applied signal, as would be necessary in practice, television signals being amplitude modulated with a depth of modulation which varies over time.

According to the invention, the Applicant has found that, to eliminate the undesired behavior described above, the diodes should be biased in such a way that the working point does not vary on varying the amplitude of the input signal, in particular by biasing the diodes to substantially constant voltage.

In the circuit of FIG. 3, as also in the circuits described in the documents cited previously, the diodes D1–D6 are current-biased. The battery voltage +V is applied to the diodes D1–D6 through a network of resistors (P1, P2, R1–R3). When the biasing of the diodes D1–D6 is performed by means of current generators or voltage generators and resistors (P1, P2, R1–R3), and there are no particular provisions for maintaining the voltage of the working point of the diodes D1–D6 constant, it can vary. For example, because of the presence of currents, as for example those due to the 2nd harmonic components, which get summed algebraically with the bias current and consequently cause the voltage of the working point of the diodes D1–D6 to vary.

Figure 5:
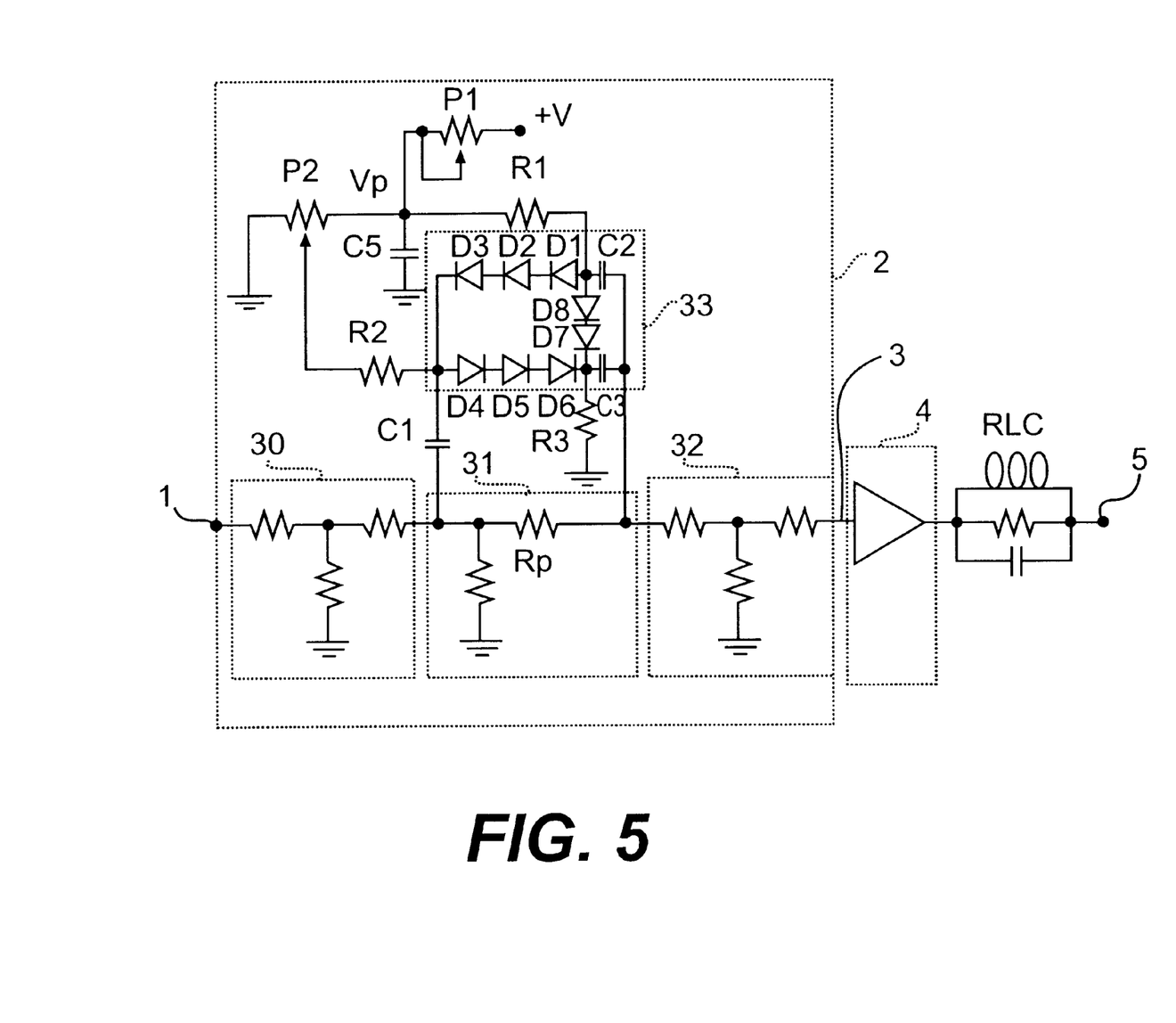
In FIG. 5 an electrical diagram of a distorter circuit according to a first embodiment of the present invention.

A first embodiment of the distorter according to the present invention is represented in FIG. 5.

Two further diodes D7 and D8 have been introduced into the nonlinear circuit 33, these being connected together in series, with the cathode of D8 connected to the anode of D7. The anode of D8 is connected to the anode of the diode D1, and the cathode of D7 is connected to the cathode of D6.

The diodes D7 and D8 are therefore connected in parallel with the series of the diodes D1–D6.

These are preferably of the same type as the diodes D1–D6, but other types of diodes may also be used. The diodes D7 and D8 are biased, by means of the resistors R1 and R2, preferably with a current of a few mA, much higher than that which passes through the diodes D1 to D6. This current determines a voltage drop across the diodes D7 and D8 which is applied to the nonlinear elements D1–D6, which become biased at a substantially fixed voltage.

The current flowing in the diodes D7 and D8 should preferably be of a value such as not to be able substantially to be influenced by the currents due to the d.c. components of current due to the distortions of even order. It is possible through the potentiometer P1 to adjust (in the calibration phase) the voltage Vp and hence the magnitude of the current flowing in the diodes D7 and D8 so as to determine the amount of the distortions produced.

Figure 6:
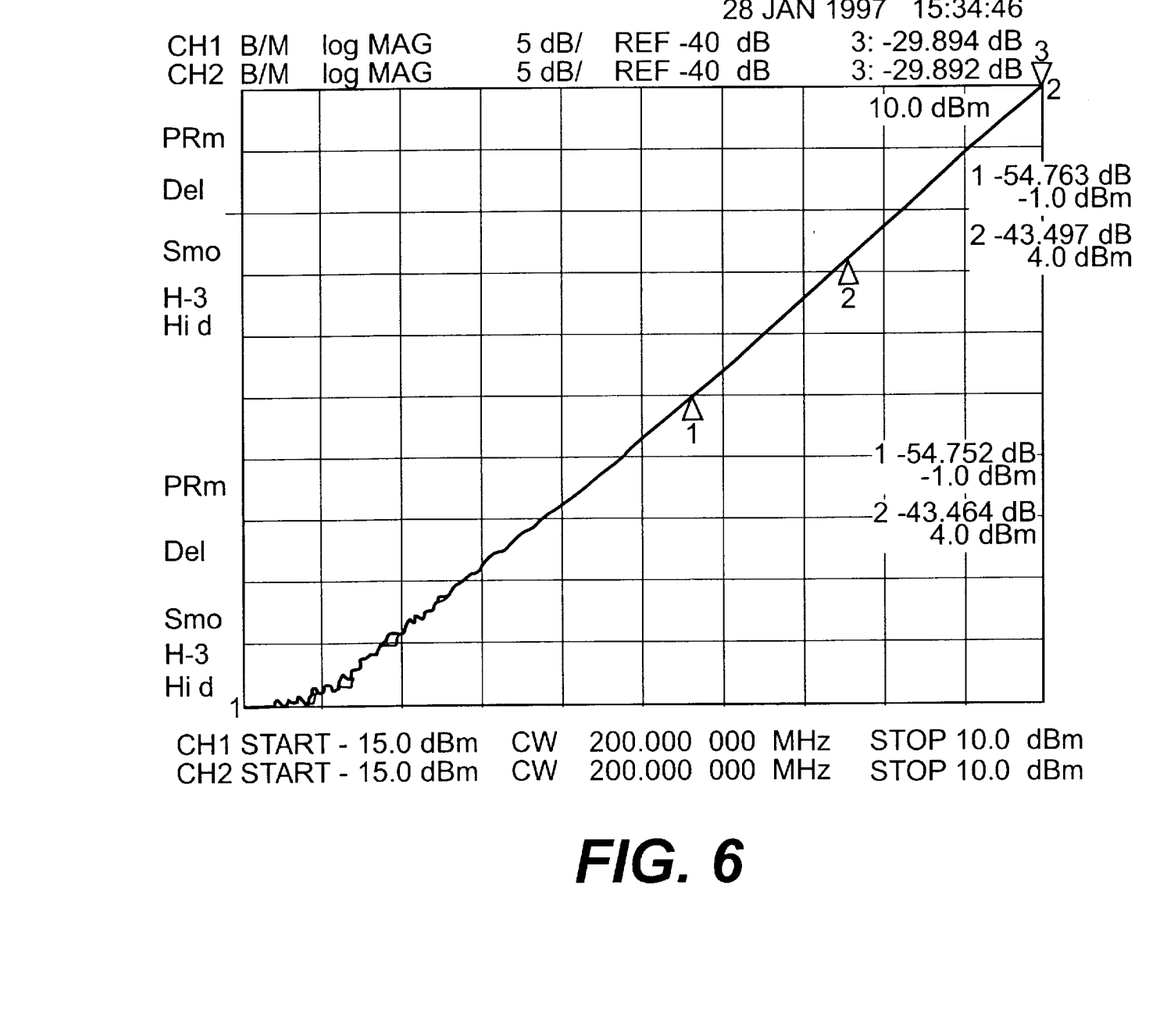
In FIG. 6 the profile of the measurement of the third-harmonic distortion of the distorter circuit of FIG. 5.

By measuring D3/C on varying the level of the signal applied to the distorter circuit, a profile is obtained which is virtually the typical one, i.e. around 2 dB of rise in D3/C for each rise in the input signal, even for signal levels around 0 dBm and above, as may be seen from FIG. 6.

In FIG. 5 it may be observed that the π passive attenuator 31 lacks a resistor which is replaced by the parallel arrangement of the two resistors R1 and R2 used for the biasing of the diodes.

The measurements of CTB and XMOD have been made, with 80 channels and a modulation index of 3.5%, on the complete circuit, obtaining the results set out in the following table, which show the good agreement between the two measurements for one and the same condition of bias of the diodes.

| Frequency (MHz) | CTB (dB) | XMOD (dB) |
|---|---|---|
| 55.25 | −65 | −63 |
| 355.25 | −64 | −62 |
| 547.25 | −65 | −63 |

Figure 7:
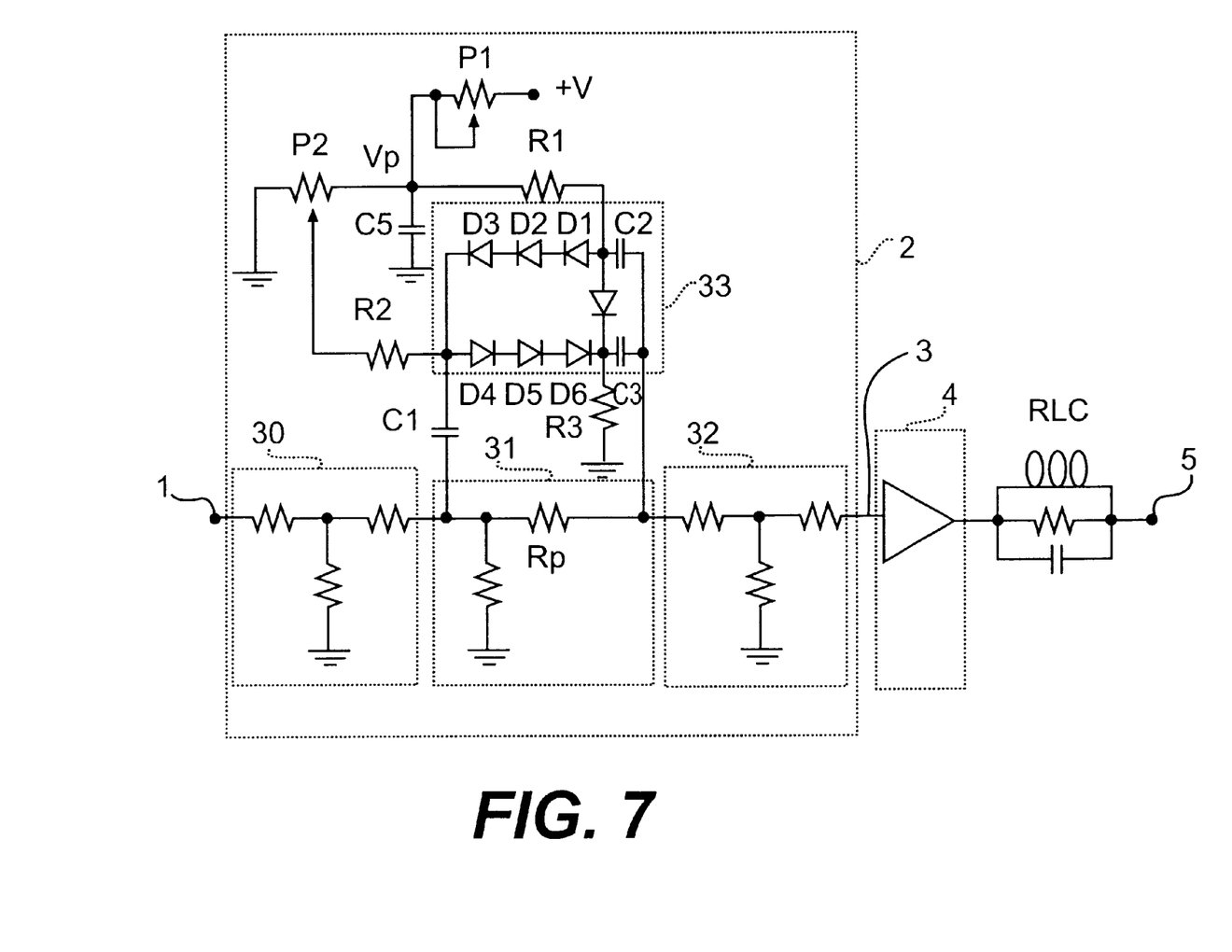
In FIG. 7 an electrical diagram of a distorter circuit according to a second embodiment of the present invention.

A second embodiment of the distorter according to the present invention is represented in FIG. 7.

In this case a single diode D7 has been used to fix the bias voltage of the diodes D1 to D6. The anode of D7 is connected to the anode of D1 and the cathode of D7 is connected to the cathode of D6. The voltage across the diode D7 is thereby applied to the nonlinear elements D1–D6.

In such a case it is possible again to obtain the same bias voltage for the diodes D1 to D6 either using a diode with a higher threshold voltage, or by increasing the current in the diode, thereby also reducing its dynamic resistance.

It is also possible to use this solution to reduce the number of diodes D1–D6 for example from 6 to 4 because the bias voltage across the diode D7 can have a lower value than that across the two diodes D7 and D8 as in the circuit of FIG. 5.

The results of the measurements made are analogous to those of the previous circuit.

Schottky type diodes are preferably used for the diodes D7 and D8 in the circuits of FIGS. 5 and 7, but other types of diodes may be used.

A few embodiments of the present invention have been described, but others can be derived therefrom but which nevertheless fall within the protective scope of the present invention, for example other circuits able to deliver a bias to the nonlinear elements in such a way that the voltage on them is maintained substantially constant.

Figure 8:
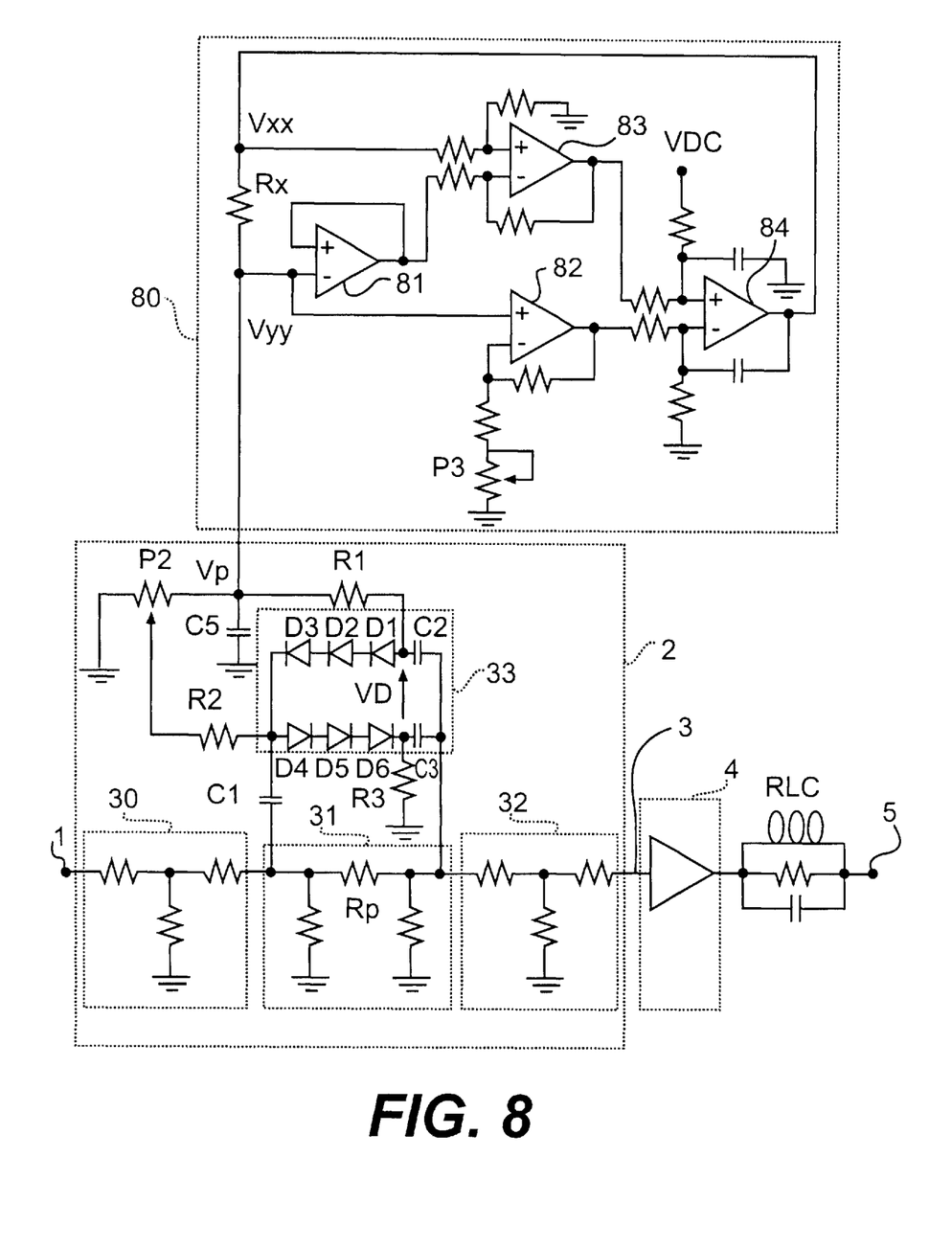
In FIG. 8 an electrical diagram of a distorter circuit according to a third embodiment of the present invention.

A third embodiment of the distorter according to the present invention is represented in FIG. 8.

In this embodiment use is made of a closed-loop control circuit 80 which indirectly measures the voltage VD across the diodes D1 to D6 to be controlled.

The closed-loop control circuit 80 is composed of an operational amplifier 81 which functions as a follower and which carries a voltage Vyy back to the inverting input of an operational amplifier 83 which performs the differential amplifier function. A voltage Vxx is applied to the non-inverting input of the. operational amplifier 83. The voltages Vxx and Vyy are the voltages across a resistor Rx through which passes the supply current for the distorter circuit 2, and the voltage Vyy is the supply voltage (identical to the voltage Vp) applied to the distorter circuit 2. The output of the operational amplifier 83 is applied to the non-inverting input of the operational amplifier 84 functioning as algebraic summator and integrator. The voltage Vyy is also applied to an operational amplifier 82, the latter applying the amplified voltage Vyy to the inverting input of the operational amplifier 84. A reference voltage VDC is also connected to the non-inverting input of the operational amplifier 84. The output of the operational amplifier 82 is applied to the inverting input of the operational amplifier 84. The output from the operational amplifier 84 prescribes the voltage Vxx.

The control circuit 80 calculates the voltage VD, extracting it from the measurement of the variation in current on the resistor Rx and from the voltage Vyy.

The voltage VD is given by:

$$VD=Vyy-(ID-(Vyy/P2))*2\ R1=Vyy*(1+(2R1/P2))-ID*2\ R1$$

where ID is the current delivered by the circuit 80 to the connection point between the resistor R1 and the potentiometer P2.

After which it carries out the comparison between the calculated voltage VD and the reference voltage VDC and produces the control voltage Vxx in such a way that the reference voltage VDC is substantially equal to the voltage VD to within a few millivolts.

In particular the operational amplifier 81, carries the voltage Vyy back to the input of the operational 83, the latter also receiving as input the voltage Vxx. The operational 83, through the resistors of suitable value connected across it, carries out the operation –ID*2 R1. The operational 82 carries out the operation –Vyy*(1+(2 R1/P2)). The operational 84 carries out the comparison between the difference of the results obtained by the operationals 82 and 83 and the voltage VDC, i.e. the voltage VDC is compared with the calculated value of VD. The result is integrated over time by the operational amplifier 84 which delivers the voltage Vxx.

The bias voltage VD of the diodes D1 to D6 is accordingly the prescribed voltage, i.e. VDC.

The potentiometer of P3 is adjusted (in the calibration phase) in such a way as to take account of the tolerances of the components.

The operational amplifiers 81, 82, 83, 84 are, for example, of the OP27 type marketed by Analog Devices.

Figure 9:
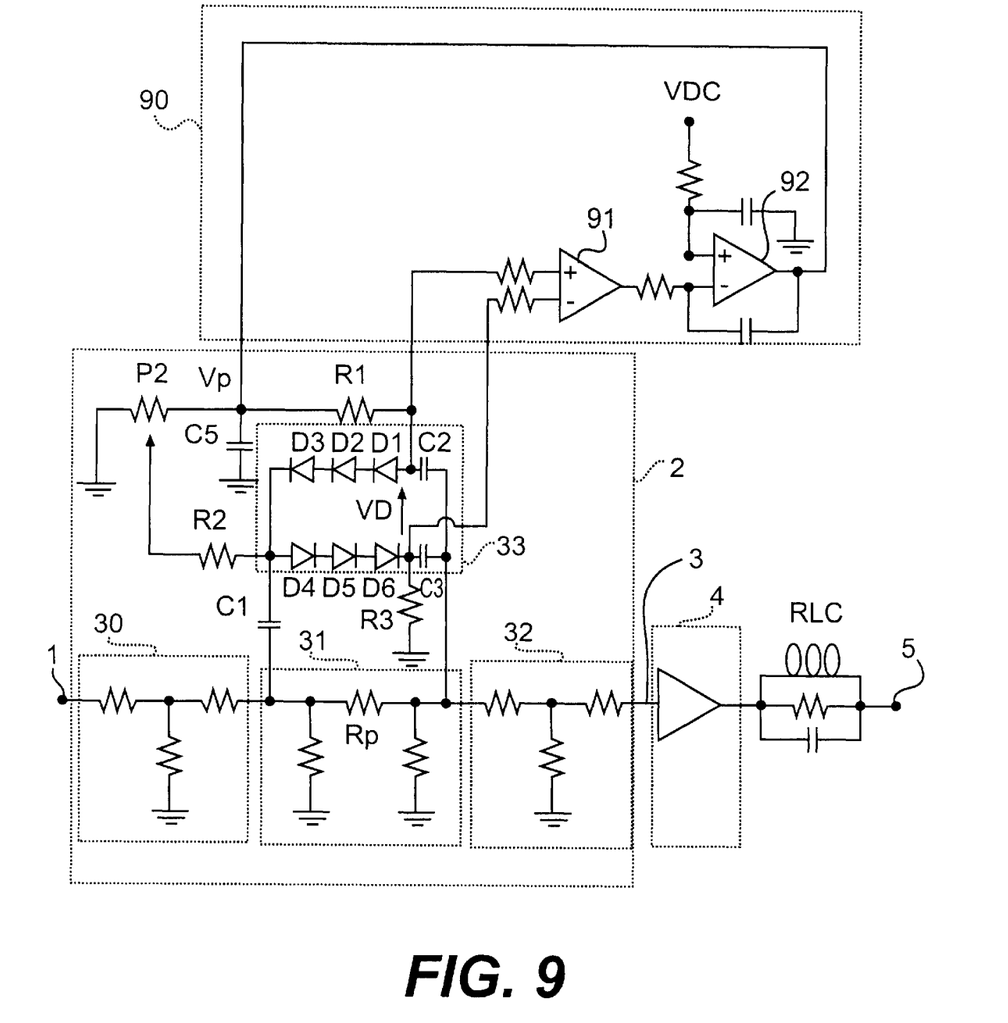
In FIG. 9 an electrical diagram of a distorter circuit according to a fourth embodiment of the present invention.

A fourth embodiment of the distorter according to the present invention is represented in FIG. 9.

In this embodiment use is made of a closed-loop control circuit 90 which directly measures the voltage VD to be controlled.

The voltage VD is applied to the inputs of an instrument amplifier 91 whose output is connected to the inverting input of an operational amplifier 92 functioning as algebraic summator and time integrator. A reference voltage VDC is connected to the non-inverting input of the operational amplifier 92. The output of the operational amplifier 92 prescribes the voltage Vp, this being the supply voltage applied to the distorter circuit 2, in such a way that the voltage VD corresponds substantially with the reference voltage VDC to within a few millivolts.

The voltage VDC makes it possible to prescribe the value of the voltage VD desired across the diodes D1–D6 as a function of the magnitude of the required distortions.

The operational amplifier 92 is for example of the OP27 type marketed by Analog Devices and the instrument amplifier 91 is for example of the INA102 type marketed by Burr Brown.

A single supply voltage has been used in all the embodiments described here, but it is possible to use several bias voltages for example with one positive and one negative, by means of circuit modifications within the scope of a person skilled in the art. In this way, the performance of the two nonlinear branches can be adjusted independently.

A few embodiments of the present invention have been described, but others can be derived therefrom, but which nevertheless fall within the protective scope of the present invention, for example other control circuits which deliver voltage or current to the nonlinear elements in such a way that the voltage on them is maintained substantially constant.

The teaching according to the present invention is also valid for other distorter circuits for example those based on transistors (or transistor and diodes), as nonlinear elements, arranged in the push-pull type configuration.

The Applicant has moreover noted that the circuit of FIG. 2 exhibits a further variation in the working point of the diodes D1 and D2 which is believed to be due to the diodes D1 and D2 detecting a peak in the signal components, jointly with the capacitors C2 and C3. The Applicant has found that it is possible to alleviate if not eliminate this drawback using capacitors C2 and C3 with a high value of capacitance, greater than the 100 nF normally used and preferably around 1 $\mu$F, so as to decrease its self-impedance with respect to the a.c. components of the signal. This expedient has been applied advantageously to the. circuits of FIGS. 8 and 9. It has not been applied in the circuits of FIGS. 5 and 7 because the presence of the diodes D7 and DB already represent a low impedance with respect to the signal.

What is claimed is:

1. Method for the predistortion of an electrical signal of variable amplitude comprising the steps of:

delivering said signal to at least one distorter circuit;

biasing said distorter circuit to a prefixed working point; and distorting said signal in said distorter circuit;

characterized in that said step of biasing said distorter circuit comprises the substep of providing a path in parallel to said distorter circuit causing that said prefixed working point does not vary on varying the amplitude of said signal at said distorter circuit by maintaining a substantially constant bias voltage.

2. Method for the predistortion of a signal according to claim 1, further comprising the steps of:

delivering said signal to a first and to a second distorter circuit;

biasing said first and second distorter circuit;

distorting said signal in said first and second distorter circuit; and combining said signals distorted by said first and second distorter circuit.

3. Method for the predistortion of a signal according to claim 1, further comprising the steps of delivering said signal to a linear attenuator and combining said attenuated signal with said distorted signal.

4. Method for the predistortion of a signal according to claim 1, wherein the step of causing that said prefixed working point does not vary on varying the amplitude of said signal comprises the substeps of:

measuring the bias voltage of said distorter circuit;

comparing said measured bias voltage with a preset reference voltage;

producing a control signal representative of said comparison; and controlling said bias voltage in response to said control signal in such a way that said bias voltage has a substantially constant preset voltage value on varying the amplitude of said signal.

5. Method for the predistortion of a signal according to claim 4, wherein the substep of producing a control signal is followed by a substep of integrating said control signal.

6. Method for the predistortion of a signal according to claim 1, wherein the step of causing that said prefixed working point does not vary on varying the amplitude of said signal comprises the substeps of:

measuring, in a portion of the circuit, an electrical quantity representative of said bias voltage of said at least one first distorter circuit;

calculating the value of said bias voltage as a function of said electrical quantity representative of said bias voltage;

comparing said calculated bias voltage with a preset reference voltage;

producing a control signal representative of said comparison; and controlling said bias voltage in response to said control signal in such a way that said bias voltage has a substantially constant preset voltage value on varying the amplitude of said signal.

7. Method for the predistortion of a signal according to claim 6, wherein said electrical quantity is a voltage.

8. Circuit for the predistortion of an electrical signal of variable amplitude comprising:

an input terminal, able to receive an electrical input signal of variable amplitude;

an output terminal, able to send out an electrical signal to correspond with said input signal;

a nonlinear element, interposed between said input terminal and said output terminal, having a preset relation between an input signal and a corresponding output signal; and a bias circuit electrically connected to said nonlinear element providing to said nonlinear element a voltage corresponding to a prefixed working point;

characterized in that said bias circuit comprises a circuit connected in parallel to said nonlinear element able to maintain the voltage substantially constant such that the prefixed working point does not vary on varying the amplitude of said input signal.

9. Circuit for the predistortion of a signal in accordance with claim 8, further comprising a first and a second nonlinear element which are connected in parallel with respect to said input signal.

10. Circuit for the predistortion of a signal in accordance with claim 8, further comprising a linear attenuator connected in parallel to said nonlinear element with respect to said input signal.

11. Circuit for the predistortion of a signal in accordance with claim 8, wherein said nonlinear element comprises at least one diode.

12. Circuit for the predistortion of a signal in accordance with claim 9, wherein said first and second nonlinear element comprises at least one diode.

13. Circuit for the predistortion of a signal in accordance with claim 12, wherein said at least one diode of said first nonlinear element is placed with opposite polarity with respect to said at least one diode of said second nonlinear element.

14. Circuit for the predistortion of a signal in accordance with claim 8, wherein said circuit connected in parallel to said nonlinear element comprises at least one diode having a bias current of a value such as not to be able to be modified by said input signal.

15. Circuit for the predistortion of a signal in accordance with claim 11 or 12 or 14, wherein said diode is a Schottky diode.

16. Circuit for the predistortion of a signal in accordance with claim 8, wherein said bias circuit is connected to said at least one nonlinear element via at least one resistor.

17. Circuit for the predistortion of a signal in accordance with claim 8, wherein said bias circuit comprises:

a circuit for measuring the bias voltage of said nonlinear element;

a generator of a preset reference voltage;

a circuit for comparing said measured bias voltage and said preset reference voltage, able to deliver a signal representing said comparison; and a circuit for controlling said bias circuit in response to said signal representing said comparison.

18. Circuit for the predistortion of a signal in accordance with claim 8, wherein said bias circuit comprises:

means for calculating the bias voltage of said nonlinear element by measuring a voltage representing said bias voltage of said nonlinear element;

a generator of a preset reference voltage;

a circuit for comparing between said measured voltage and said preset reference voltage, able to deliver a signal representing said comparison; and a circuit for controlling said bias circuit in response to said signal representing said comparison.

19. Circuit for the predistortion of a signal in accordance with claim 18, wherein said calculating means comprises an analogue calculating circuit.

20. Circuit for the predistortion of a signal in accordance with claim 17 or 18, further comprising a circuit integrating said signal representing said comparison.

21. Circuit for the predistortion of a signal in accordance with claim 10, wherein said linear attenuator comprises a resistor.

22. Circuit for the predistortion of a signal in accordance with claim 8 wherein said nonlinear element comprises a capacitor which exhibits an impedance with respect to the a.c. components of the signal of low value relative to the impedance seen by said capacitor.

23. Circuit for the predistortion of a signal in accordance with claim 8, wherein said bias circuit comprises an adjustable voltage generator.

24. Circuit for the predistortion of a signal in accordance with claim 8, wherein said bias circuit comprises an adjustable current generator.

25. Externally modulated optical transmitter comprising:

a predistorter circuit adapted to be fed with a modulating signal, the circuit comprising at least one biased nonlinear element;

a bias circuit able to provide to said nonlinear element a voltage corresponding to a prefixed working point;

an electrooptical modulator, able to output a modulated optical signal, having an electrical input to which the predistorted modulating signal is applied and having an optical input; and a radiation source connected to the optical input of said electrooptical modulator;

characterized in that said bias circuit comprises a circuit connected in parallel to said nonlinear element able to maintain the voltage substantially constant such that the prefixed working point does not vary on varying the amplitude of said modulating signal.

26. Externally modulated optical transmitter in accordance with claim 25, wherein said electrooptical modulator comprises an interferometric modulator of the Mach-Zehnder type.

27. Externally modulated optical transmitter in accordance with claim 25, further comprising an amplifier having an input for the predistorted modulating signal and an output connected to said electrooptical modulator.

* * * * *